United States Patent Office 3,228,802
Patented Jan. 11, 1966

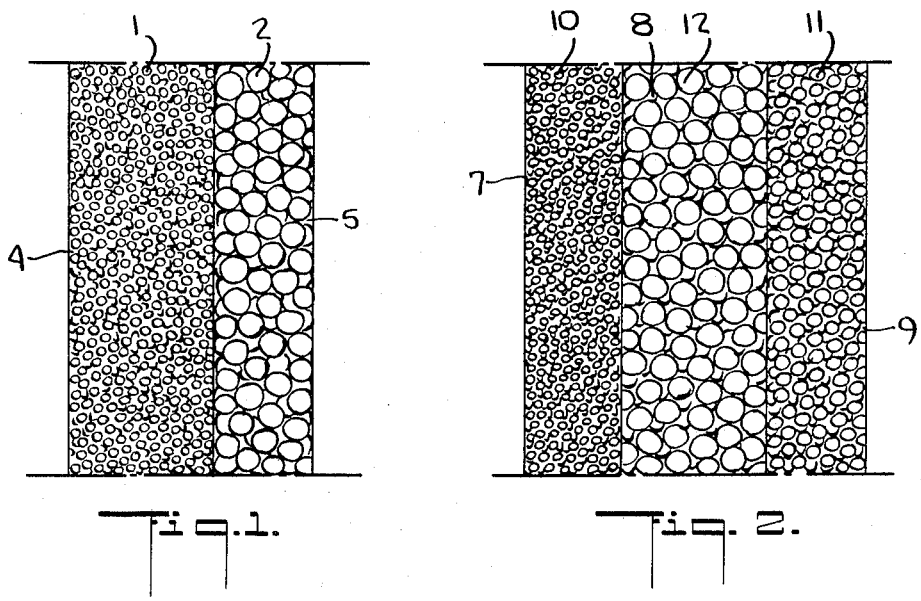
Fig. 1.
Fig. 2.
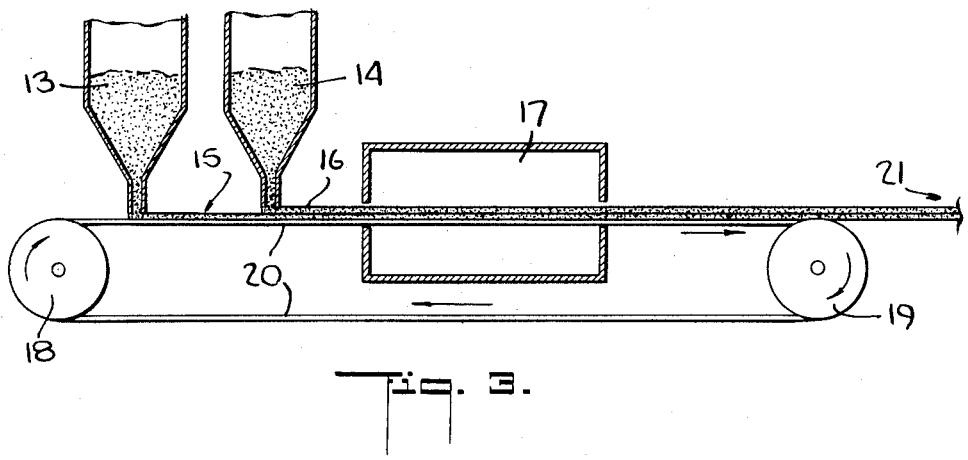
Fig. 3.
INVENTOR.
RICHARD RABL

3,228,802
STORAGE BATTERY SEPARATOR
Richard Rabl, Vienna, Austria, assignor to Varta Aktiengesellschaft, Hagen, Westphalia, Germany, a company of Germany
Filed Feb. 12, 1960, Ser. No. 8,262
Claims priority, application Austria, Feb. 18, 1959, A 1,263/59
11 Claims. (Cl. 136—145)

The present invention relates to microporous plastic separators for storage batteries and to a manufacturing process for such separators.

Conventional microporous plastic separators have been made by sintering plastic powder of a specific surface of 2,000 sq.cm./g. to 2,500 sq.cm./g. Such separators have been perfectly satisfactory for automobile starting and lighting batteries. However, in storage batteries which are subjected daily to maximum discharges, such as batteries for electric trolleys or locomotives, lift trucks, and the like, the active mass tends to grow through the separator pores between the positive and negative plates, which rapidly leads to the destruction of the entire battery.

This condition could be avoided if the pore size were reduced but this would require the use of finer plastic powders for the production of the sintered separators. If a particularly fine plastic powder could successfully be sintered to give a microporous body suited as a separator, even the most severe strains on the battery could be sustained without migration of the active mass into the separator pores. When attempting to proceed in this way, for instance by using a polystyrene powder with a specific surface of about 5,000 sq.cm./g. or more, however, the sintered layer of such finer particles as obtained by the sintering process tends to form cracks, causing again the active mass to grow through the separator plate. It is therefore practically impossible to produce an even and reliable layer of such a fine plastic powder so that the industrial manufacture of sintered plastic separators from such starting materials is presently out of question.

It is one object of the present invention to provide a highly satisfactory separator which is free of the disadvantages of the separators made heretofore and which can readily be manufactured in a simple manner.

Another object of the present invention is to provide a simple and effective process of producing such new and valuable microporous separators.

Other objects of the present invention and advantageous features thereof will become apparent as the description proceeds.

According to the present invention a highly satisfactory separator is obtained when the separator consists of at least two microporous layers of the same plastic material but of substantially different pore size, the average pore size of one layer being in the order of magnitude of $1\mu$ to $20\mu$, and the average pore size of an adjacent layer being substantially greater. The term "substantially different pore size" is used throughout the specification and claims to designate pore sizes the average diameters of which have a ratio of at least 1:2. In other words, the average pore size of one layer of the laminated separator is at least about double the average pore size of the other separator layer.

Surprisingly, such laminated microporous plastic separators do not exhibit any tendency to form cracks. They withstand satisfactorily even the most strenuous loads of batteries used in trucks, trolleys, locomotives and the like although the individual layers are relatively thin and only a portion of the separator thickness has a small enough pore size to prevent incrustation by the active mass of the storage battery.

According to one embodiment of the invention, the separator consists of two layers of microporous plastic, the one layer having an average pore size in the order of magnitude of $1\mu$ to $20\mu$ while the other layer has an average pore size in the order of magnitude of $8\mu$ to $100\mu$, the average pore diameters in one layer being at least about twice the average port diameters in the other layer.

According to another embodiment of the invention, the separator consists of three microporous layers, the two outer layers having an average pore size in the order of magnitude of $1\mu$ to $10\mu$ while the intermediate layer has an average pore size in the order of magnitude of $8\mu$ to $50\mu$. In this manner, the outer layers in contact with the active mass have very fine pores, which prevent the mass from entering, while the intermediate layer has a somewhat larger pore size assuring a sufficiently low resistance.

In principle, the invention is applicable to all plastics which have been used for the manufacture of microporous storage battery separators, such as polystyrene, polyvinylchloride, and polyethylene. These plastics may contain the conventional fillers, and additives, for instance up to 10% kieselguhr, kaolin, hard rubber, etc., all of the required fineness to assure the microporous structure of the sintered plastic body.

The lower limit for the grain size of the starting material powders is given by the porosity required to assure a maximum resistance acceptable for the separator. If this maximum resistance were exceeded, the operation of the storage battery would be impaired or inhibited. Furthermore, powders which are too fine cannot be formed into an even layer to make sintering possible.

Therefore, generally speaking, the plastic powder used for the separator layer of finer porosity will have a grain size of about $4\mu$ to $20\mu$ corresponding to a specific surface of about 4,000 sq.cm./g. to 10,000 sq. cm./g. The separator layer of coarser porosity will be produced from a plastic powder of the conventional grain size, i.e., about $20\mu$ to $100\mu$ corresponding to a specific surface of about 1,000 sq.cm./g. to 3,000 sq.cm./g.

The invention also provides a preferred method of manufacturing laminated microporous plastic separators with layers of different porosity. In accordance with this method, the desired plastic is applied on a support in the form of superposed layers of a powder of the same plastic but of different grain size, the powder of the lowest layer having the smaller grain size, and sintering the plastic powder together to produce an integral sintered body of layers of different porosity.

Thus, in the simplest case, finer and coarser powder of the same plastic is applied in two superposed layers while, in another embodiment, a layer of fine powder is followed by one of coarser powder and again by a layer of fine powder. In this manner, plastic powder may be poured evenly and in thick enough layers to enable the layers to be sintered satisfactorily on conventional sintering apparatus.

The support used in this process can be a band of metal, for instance a steel strip, or also a web of paper or of Teflon-coated glass fibers. Where a web of paper or the like flexible support is used, a process for applying the plastic powder as disclosed in my copending application Serial No. 744,284 can be employed with benefit. Furthermore, the coarser powder needs not necessarily be applied in a completely even manner, but can be applied in such manner that longitudinal ribs are formed on the layer surface, so that the separator when sintered has spacing ribs. The sintering temperatures used in the process will depend on the nature of the particular plastic as well as on the time of the sintering operation and to some extent also on the thickness of the powder layer and on the grain size of the plastic powder.

The manufacture of laminated microporous plastic separators with layers of different porosity will be illustrated in the following specific examples without, however, limiting the invention thereto.

*Example 1*

A powder layer of 1.15 mm. thickness of a polystyrene powder of a specific surface of 6,000 sq. cm./g. was applied on a continuously moving band through a funnel with a mouth of the desired width. A second funnel was provided to apply over this layer a second layer of polystyrene powder of the same quality but of a specific surface of 2,500 sq. cm./g., the thickness of the second powder layer being 0.85 mm. The moving band carrying the two superposed polystyrene powder layers was passed through a sintering kiln of known structure and the layers were sintered at a temperature of 200° C. to 250° C. for eight to four minutes, the lower temperature requiring the longer sintering time and vice versa.

*Example 2*

A powder layer of 0.7 mm. thickness of a polystyrene powder of a specific surface of 8,000 sq. cm./g. was applied to a continuously moving band through a funnel with a mouth of the desired width. A second funnel was provided to apply over the first layer a second layer of polystyrene powder of the same quality but of a specific surface of 2,000 sq. cm./g., the thickness of the second powder layer being about 1.1 mm. Finally, a third funnel was used to apply a third layer over the second layer, the third powder layer having a thickness of 0.7 mm. and consisting of polystyrene powder of the same quality but of a specific surface of 4,000 sq. cm./g. The moving band was passed through a conventional plastic sintering kiln where the layers were sintered at a temperature of 200° C. to 250° C. for about ten to four minutes.

For a better understanding of the novel features of the present invention drawings are attached. Of these drawings FIG. 1 is a cross-sectional view on an enlarged scale of a laminated microporous plastic separator with two layers of sintered plastic material;

FIG. 2 is a cross-sectional view on an enlarged scale of a laminated microporous plastic separator with three layers of sintered plastic material; and FIG. 3 is a schematic view showing the manufacture of the laminated microporous plastic separator of FIG. 1.

In said figures like reference characters indicate like elements.

FIG. 1 illustrates the two-layer separator obtained according to Example 1. Layer 1 consists of microporous sintered polystyrene made from a polystyrene powder of a specific surface of about 6,000 sq. cm./g. This layer 1 is about 1.0 mm. thick in view of approximately 15% shrinkage during sintering. Pores 4 which are, of course, illustrated schematically have a pore diameter within the range of about $1\mu$ to $10\mu$. Layer 2 which is firmly attached to said layer 1 by sintering consists of microporous sintered polystyrene made from polystyrene powder of a specific surface of about 2,500 sq. cm./g. This layer 2 due to shrinkage is about 0.7 mm. thick. Its pores 5 have a pore diameter substantially greater than that of pores 4.

FIG. 2 illustrates the three-layer separator obtained according to Example 2. Layer 10 consists of microporous sintered polystyrene made from very fine polystyrene powder of a specific surface of 8,000 sq. cm./g. with pores 7 of a diameter within the range of about $1\mu$ to $8\mu$. Layer 12 is firmly attached by sintering to said layer 10 and consists of microporous sintered polystyrene made from coarser polystyrene powder of a specific surface of about 2,000 sq. cm./g. while layer 11 which, in turn, is firmly attached by sintering to said layer 12 consists of microporous sintered polystyrene made from finer polystyrene powder of a specific surface of about 4,000 sq. cm./g. Pores 8 of layer 12 have a diameter within the range of about $1\mu$ to $10\mu$, while pores 9 of layer 11 have a substantially greater diameter than the pores in layers 10 and 12. The thickness of layers 10, 12, and 11 is, respectively, about 0.6 mm., 0.9 mm., and 0.6 mm.

FIG. 3 illustrates schematically the manufacture of a two layer separator according to Example 1. The fine polystyrene powder is applied by means of feeding funnel or hopper 13 to moving band 20 whereby the lower part of said feeding funnel 13 is spaced from moving band 20 so as to provide the layer 15 of the desired thickness of about 1.15 mm. The coarser polystyrene powder is then applied to said first layer 15 by means of feeding funnel or hopper 14 which is spaced from said first layer 15 so as to provide the second layer 16 of the desired thickness of about 0.85 mm. Moving band 20 with superposed layers 15 and 16 pass through sintering kiln 17 of a temperature between about 200° C. and about 250° C. The speed of moving band 20 and the length of sintering kiln 17 are adjusted in such a manner that the two layers 15 and 16 of finer and coarser polystyrene powder are exposed to sintering temperature for the required period of time, for instance, for five minutes when using a temperature of about 240° C. Rolls 18 and 19 provide for movement of band 20 in the direction of the arrows. The sintered microporous two-layer separator 21 is removed from band 20 and cut to pieces of the desired dimensions.

The thickness of the layers may vary. In general, a thickness of each layer between about 0.4 mm. and about 1.5 mm. should not be exceeded. The preferred thickness is that given in the examples.

While the invention has been specifically described in connection with certain preferred embodiments, it will be understood that variations and modifications may occur to the skilled in the art, particularly after benefiting from the present teaching, without departing from the spirit and scope of this invention, as defined by the appended claims.

I claim:

1. In a unitary sintered microporous separator for storage batteries comprising a plurality of sintered porous layers of the same particulate resin material, in which the average diameters of the pores of adjacent layers are in a ratio of at least 2 to 1, the improvement consisting of having sintered adjacent layers in which the average pore size of one layer is in the range of about 20 microns to 1 micron, and the pore size of the other layer is in the range of about 100 microns to about 8 microns.

2. The separator of claim 1 in which in the adjacent layers, the average pore size of one layer is in the range of about 20 microns to 4 microns and the other layer is in the range of about 100 microns to 2 microns.

3. The separator of claim 1 in which in the adjacent layers, the average pore size of one layer is in the range of about 10 microns to 1 micron and the other layer is in the range of about 50 microns to 8 microns.

4. In a unitary sintered microporous separator for storage batteries comprising two sintered porous layers of the same particulate resin material, in which the average diameters of the pores of adjacent layers are in a ratio of at least 2 to 1, the improvement consisting of having sintered adjacent layers in which the average pore size of one layer is in the range of about 20 microns to 1 micron, and the pore size of the other layer is in the range of about 100 microns to about 8 microns.

5. In a unitary sintered microporous separator for storage batteries comprising two outer layers and an intermediate layer of porous sintered layers of the same particulate resin material, in which the average diameters of the pores of adjacent layers are in a ratio of at least 2 to 1, the improvement consisting in having two outer layers having an average pore size is in the range of about 1 micron to 10 microns and the intermediate layer having a pore size in the range of about 50 microns to about 8 microns.

6. The separator of claim 1 in which the resin in the layers is polystyrene.

7. The separator of claim 2 in which the resin in the layers is polystyrene.

8. The separator in claim 3 in which the resin is polystyrene.

9. The separator of claim 4 in which the resin in the layers is polystyrene.

10. The separator of claim 5 in which the resin is polystyrene.

11. The separator of claim 4 in which each layer has a thickness not exceeding about 1.0 mm.

References Cited by the Examiner

UNITED STATES PATENTS

| | | | |
|---|---|---|---|
| 2,015,006 | 9/1935 | Ekisler | 136—148 |
| 2,297,248 | 9/1942 | Rudolph | 18—55 |
| 2,465,493 | 3/1949 | Strickhouser et al. | 136—145 |
| 2,653,985 | 9/1953 | Philipps | 136—145 |
| 2,655,552 | 10/1953 | Fuller et al. | 136—146 |
| 2,662,929 | 12/1953 | Dague | 136—148 |
| 2,698,966 | 1/1955 | Stott et al. | 18—55 |
| 3,045,058 | 7/1962 | Martinak | 136—148 |

WINSTON A. DOUGLAS, *Primary Examiner.*

JOHN H. MACK, JOHN R. SPECK, JOSEPH REBOLD,
*Examiners.*